(12) United States Patent
Terauchi et al.

(10) Patent No.: US 10,419,694 B2
(45) Date of Patent: *Sep. 17, 2019

(54) METHOD AND APPARATUS FOR IMAGING AN OBJECT

(71) Applicant: RICOH IMAGING COMPANY, LTD., Tokyo (JP)

(72) Inventors: Masakazu Terauchi, Tochigi (JP); Yasuhiro Kazama, Kanagawa (JP); Hirotaka Ueno, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,870

(22) Filed: Oct. 11, 2018

(65) Prior Publication Data

US 2019/0045146 A1 Feb. 7, 2019

Related U.S. Application Data

(62) Division of application No. 14/528,167, filed on Oct. 30, 2014, now Pat. No. 10,136,079.

(30) Foreign Application Priority Data

| Oct. 31, 2013 | (JP) | 2013-227405 |
| Oct. 31, 2013 | (JP) | 2013-227463 |
| Oct. 31, 2013 | (JP) | 2013-227496 |

(51) Int. Cl.
*H04N 5/355* (2011.01)
*H04N 9/04* (2006.01)
(Continued)

(52) U.S. Cl.
CPC ........... *H04N 5/355* (2013.01); *H04N 5/2355* (2013.01); *H04N 5/347* (2013.01); *H04N 9/045* (2013.01)

(58) Field of Classification Search
CPC ...... H04N 5/355; H04N 5/347; H04N 5/2355; H04N 9/045
See application file for complete search history.

(56) References Cited

U.S. PATENT DOCUMENTS

| 7,471,322 B2 | 12/2008 | Shimizu |
| 2003/0010896 A1 | 1/2003 | Kaifu et al. |

(Continued)

FOREIGN PATENT DOCUMENTS

| JP | 8-223491 | 8/1996 |
| JP | 2003-018465 | 1/2003 |

(Continued)

OTHER PUBLICATIONS

Office Action issued in Japan Patent Appl. No. JP 2013-227405 dated Jun. 6, 2017, along with an English translation thereof.

(Continued)

*Primary Examiner* — Twyler L Haskins
*Assistant Examiner* — Angel L Garces-Rivera
(74) *Attorney, Agent, or Firm* — Greenblum & Bernstein, P.L.C.

(57) ABSTRACT

An apparatus for imaging an object has a metering image sensor that comprises a plurality of pixels. The plurality of pixels is matrix-arrayed along vertical and horizontal directions. The apparatus also has an image sensor driver that drives the metering image sensor, which reads image-pixel signals of neighboring pixels among the plurality of pixels while mixing the image-pixel signals. The apparatus also has a pixel addition setting processor that sets a number of pixel addition of the metering image sensor with respect to at least one of at least one row and at least one column. The pixel addition setting processor sets different numbers of pixel addition to different pixel areas. The apparatus also has an (Continued)

exposure controller that controls an exposure of the metering image sensor and the photography image sensor.

8 Claims, 15 Drawing Sheets

(51) Int. Cl.
*H04N 5/235* (2006.01)
*H04N 5/347* (2011.01)

(56) References Cited

U.S. PATENT DOCUMENTS

| | | |
|---|---|---|
| 2005/0231623 A1 | 10/2005 | Suzuki |
| 2009/0316015 A1 | 12/2009 | Iwasa et al. |
| 2010/0295961 A1 | 11/2010 | Terauchi |
| 2010/0295962 A1 | 11/2010 | Terauchi |
| 2010/0322514 A1 | 12/2010 | Koehler |
| 2010/0329658 A1 | 12/2010 | Yamada et al. |
| 2010/0329659 A1 | 12/2010 | Yamada et al. |
| 2010/0329665 A1 | 12/2010 | Yamada et al. |
| 2012/0257081 A1 | 10/2012 | Mine |
| 2012/0268641 A1 | 10/2012 | Kazama |
| 2012/0301125 A1* | 11/2012 | Ashida ............... G03B 13/36 396/95 |
| 2012/0307098 A1 | 12/2012 | Hasegawa |
| 2012/0327280 A1 | 12/2012 | Ishii |
| 2013/0342754 A1 | 12/2013 | Terauchi |
| 2014/0263964 A1 | 9/2014 | Yang |

FOREIGN PATENT DOCUMENTS

| | | |
|---|---|---|
| JP | 2004-096611 | 3/2004 |
| JP | 2004-201228 | 7/2004 |
| JP | 4051674 | 2/2008 |
| JP | 4196588 | 12/2008 |
| JP | 2010-011008 | 1/2010 |
| JP | 2010-028781 | 2/2010 |
| JP | 2010-273023 | 12/2010 |
| JP | 2010-273038 | 12/2010 |
| JP | 2011-7877 | 1/2011 |
| JP | 2011-28241 | 2/2011 |
| JP | 2011-28242 | 2/2011 |
| JP | 2011-28243 | 2/2011 |
| JP | 2012-145862 | 8/2012 |
| JP | 2012-222469 | 11/2012 |
| JP | 2012-227839 | 11/2012 |
| JP | 2012-253462 | 12/2012 |
| JP | 2013-009190 | 1/2013 |
| JP | 2013-074437 | 4/2013 |
| JP | 2013-178564 | 9/2013 |

OTHER PUBLICATIONS

Office Action issued in Japan Patent Appl. No. JP 2013-227463 dated Jun. 13, 2017, along with an English translation thereof.
Office Action issued in Japan Patent Appl. No. JP 2013-227496 dated Jul. 11, 2017, along with an English translation thereof.

* cited by examiner

FIG. 10A

| A1+A2 | B1+B2+C1+C2 | D1+D2 |
|---|---|---|
| A3 | B3+C3 | D3 |
| A4+A5 | B4+B5+C4+C5 | D4+D5 |
| A6 | B6+C6 | D6 |

<NUMBER OF PIXEL ADDITION "1,2,4">

FIG. 10B

| A1+A2 | B1+B2+C1+C2+D1+D2 |
|---|---|
| A3 | B3+C3+D3 |
| A4+A5 | B4+B5+C4+C5+D4+D5 |
| A6 | B6+C6+D6 |

<NUMBER OF PIXEL ADDITION "1,2,3,6">

FIG. 16

| A1+A2 | B1+B2 | C1+C2 | D1+D2 | ... | OB1+OB2 |
|---|---|---|---|---|---|
| A3 | B3 | C3 | D3 | ... | OB3 |
| A4+A5 | B4+B5 | C4+C5 | D4+D5 | ... | OB4+OB5 |
| A6 | B6 | C6 | D6 | ... | OB6 |
| ... | ... | ... | ... | ... | ... |
| OB7 | OB8 | OB9 | OB10 | ... | ... |

<OUTPUT PIXEL>

FIG. 17

| A1+B1 | C1 | D1 |
|---|---|---|
| A2+B2 | C2 | D2 |
| A3+B3 | C3 | D3 |
| A4+B4 | C4 | D4 |
| ... | ... | ... |
| OB7+OB8 | OB9 | OB10 |

<OUTPUT PIXEL>

METHOD AND APPARATUS FOR IMAGING AN OBJECT

CROSS REFERENCES TO RELATED APPLICATIONS

This Application is a divisional application of the pending U.S. patent application Ser. No. 14/528,167, filed on Oct. 30, 2014, which claims priority from Japanese Patent Application No. 2013-227405, filed on Oct. 31, 2013, No. 2013-227463, filed on Oct. 31, 2013, and No. 2013-227496, filed on Oct. 31, 2013, the contents of which are hereby incorporated by reference in their entireties.

BACKGROUND OF THE INVENTION

1. Field of the Invention

This invention relates to an image pickup apparatus that is utilizable to such as a camera, and particularly it relates to a reading process for image-pixel signals generated by an image sensor.

2. Description of the Related Art

As for a digital camera with an image sensor, it is required to produce a subject image by a wide dynamic range. For example, when an image sensor is used as a light-metering sensor or AE sensor, the brightness of an object should be precisely detected between a low luminance level and a high luminance level to determine an appropriate exposure value such as a shutter speed. Various methods for enlarging the dynamic range of an image sensor are known or proposed. For example, an exposure time is changed in each pixel, a plurality of images is acquired in time series, or an amount of incident light is changed in each pixel by dividing a light path. Also, it is known that pixels having low sensitivities and pixels having high sensitivities are mixture-arrayed. In this case, OB image-pixel signals that are read from OB (Optical Black) pixels having high sensitivity are utilized to calculate output values of OB image-pixel signals that are read from OB pixels having low sensitivity. Thus, values of image-pixel signals generated in a light-receiving area are corrected adequately.

On the other hand, a method that reads out pixel signals while mixing or adding pixel signals is known. For example, a light-metering sensor incorporated in an SLR type digital camera outputs image-pixel signals while adding pixels. JP2012-253462A1 discloses a camera having an AE sensor with a color filter array, in which R, G, and B color elements are arrayed in a stripe along a vertical direction of the AE sensor. Then, five pixel signals that are neighboring one another along the vertical direction are mixed in each of the R, G, and B color filter elements. The five mixed pixel signals of each color element are output as one pixel signal.

Such a pixel adding method improves the sensitivity in a low luminance range; however, a real effect that enlarges a dynamic range totally cannot be obtained since a pixel adding process is uniformly performed on the entire light-receiving area of the image sensor.

On the other hand, a metering sensor in the camera is utilized to pursue a subject by extracting characteristics of the subject, such as a face, and high resolution is required to extract the characteristics of the subject. In the above pixel adding method disclosed in JP2012-253462A1, to prevent a decrease in resolution the pixel adding process is not performed when pursuing a subject using the metering sensor.

In this case, the sensitivity in the low luminance level is not increased. Also, the number of image-pixel signals to mix, i.e., the number of added pixels, is constant under any photography condition when performing the pixel addition process.

Furthermore, in the above pixel adding method disclosed in JP2012-253462A1, output levels of OB image-pixel signals corresponding to output levels of image-pixel signals generated by the pixel addition process are not considered sufficiently.

SUMMARY OF THE INVENTION

The present invention is directed to carry out a pixel addition process that allows a dynamic range of an image sensor to be enlarged.

An apparatus for imaging an object, according to the present invention has an image sensor that comprises a plurality of pixels. The plurality of pixels is matrix-arrayed along vertical and horizontal directions. The apparatus also has an image sensor driver that drives the image sensor, and the image sensor driver is capable of reading image-pixel signals of neighboring pixels among the plurality of pixels while mixing the image-pixel signals. The apparatus also has a pixel addition setting processor that sets the number of pixel addition with respect to at least one of at least one row and at least one column. The pixel addition setting processor sets different numbers of pixel addition to different pixel areas. The image sensor driver reads the image-pixel signals in response to the set number of pixel addition.

An apparatus for imaging an object, according to another aspect of the present invention, has a metering image sensor that comprises a plurality of pixels, the plurality of pixels being matrix-arrayed along vertical and horizontal directions; a photography image sensor; an image sensor driver that drives the metering image sensor, the image sensor driver being capable of reading image-pixel signals of neighboring pixels among the plurality of pixels while mixing the image-pixel signals; and a pixel addition setting processor that sets the number of pixel addition of the metering image sensor with respect to at least one of at least one row and at least one column, the pixel addition setting processor being capable of setting different numbers of pixel addition to different pixel areas; and an exposure controller that controls an exposure of the metering image sensor and the photography image sensor, the pixel addition setting processor being capable of switching the number of pixel addition, the image sensor driver reading the image-pixel signals in response to the set number of pixel addition, the exposure controller setting an exposure value of the photography image sensor on the basis of the brightness of an object image that is detected by the metering image sensor.

An apparatus for imaging an object, according to another aspect of the present invention, has an image sensor that comprises a plurality of effective pixels and a plurality of OB (optical black) pixels, the plurality of effective pixels being matrix-arrayed along vertical and horizontal directions, the plurality of OB pixels being arrayed along at least one of the row and column of the effective pixels; an image sensor driver that drives the image sensor, the image sensor being capable of reading image-pixel signals of neighboring pixels among the plurality of pixels and the plurality of OB pixels while mixing the image-pixel signals; a pixel addition setting processor that sets the number of pixel addition of the effective pixels and the plurality of OB pixels with respect to at least one of at least one row and at least one column; and an image-pixel signal correcting processor that corrects effective image-pixel signals that are read from the effective pixels on the basis of corresponding OB image-pixel signals, the pixel addition setting processor setting different numbers of pixel addition to different pixel areas, the image sensor driver reading the image-pixel signals in response to the set number of pixel addition, the image-pixel signal correcting processor correcting the effective image-pixel signals using OB image-pixel signals corresponding to the set number of pixel addition.

BRIEF DESCRIPTION OF THE DRAWINGS

The present invention will be better understood from the description of the preferred embodiments of the invention set forth below, together with the accompanying drawings, in which:

FIGS. 10A and 10B are views illustrate a pixel addition process along the row and column directions, respectively;

FIG. 16 is a view showing a pixel addition process along the row direction by different numbers of pixel addition; and FIG. 17 is a view showing a pixel addition process along the column direction by different numbers of pixel addition.

DESCRIPTION OF THE PREFERRED EMBODIMENTS

Hereinafter, the preferred embodiments of the present invention are described with reference to the attached drawings.

Figure 1:
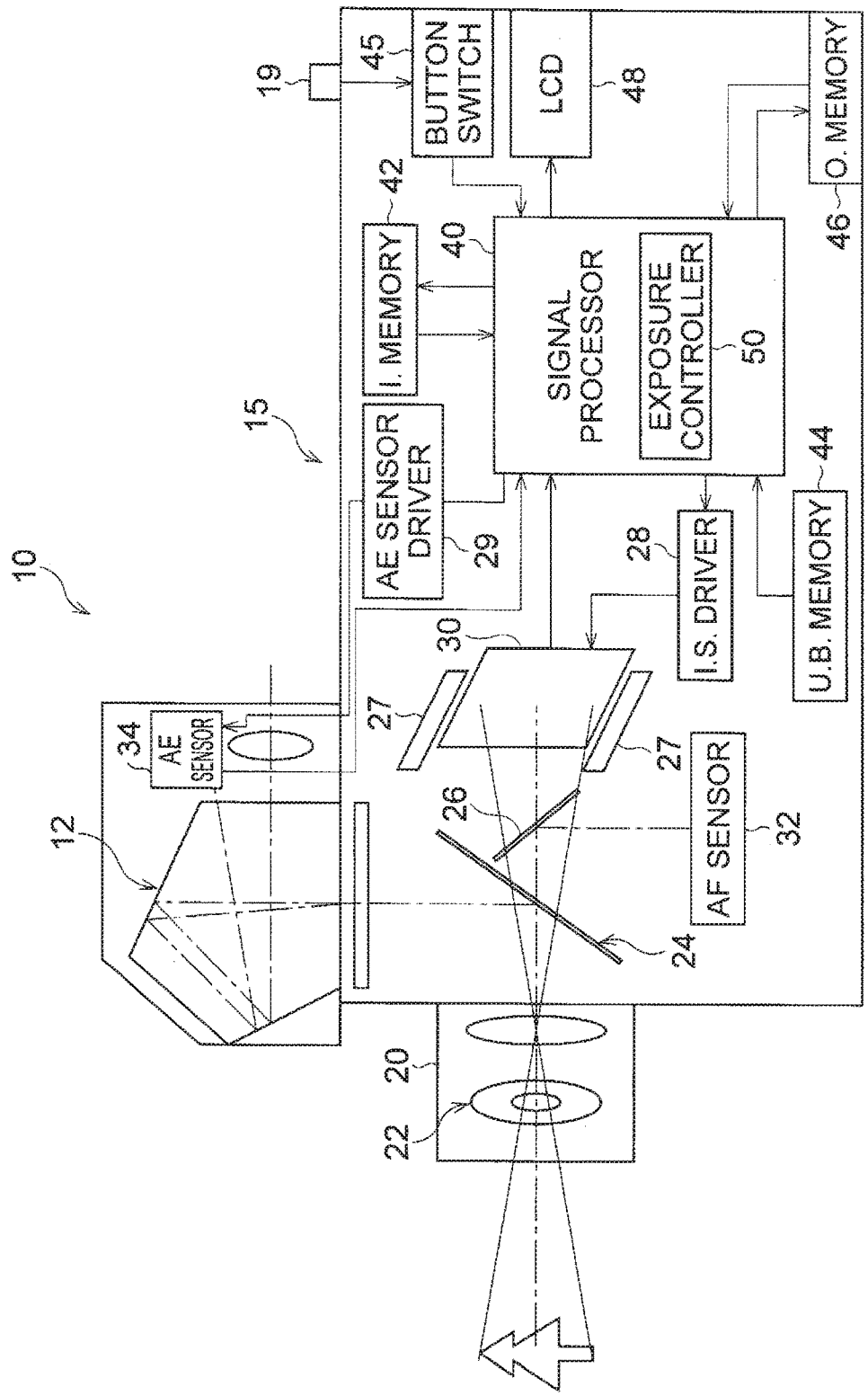
FIG. 1 is a block diagram of a digital camera according to the first embodiment.

FIG. 1 is a block diagram of a digital camera according to the first embodiment.

An SLR-type digital camera 10 is equipped with a body 15 and a photographing optical system 20 detachably attached to the body 15. A user can select and set a mode from various modes such as a photography mode, a replay mode, etc., by operating a mode dial or mode button (not shown). When electric power is turned on, the photography mode is set.

Light reflected off a target subject enters into the photographing optical system 20 and an iris 22, and a portion of the light is directed to an optical finder 12 by a quick return mirror 24. Also, a portion of the light passes through the quick return mirror 24 and is directed to an AF sensor 32 by a half mirror 26.

The optical finder 12 forms light that entered the optical finder 12 so that a user can confirm an object image via an eyepiece lens (not shown). Also, an AE sensor 34 is disposed near to the optical finder 12 and an object image is formed on a light-receiving area of the AE sensor 34.

A signal processor 40 that is constructed of a DSP outputs control signals to a shutter 27, an image sensor driver 28, an LCD 48, a timing generator (not shown), etc.; and controls the motion of the camera 10, including an AF process, a photographing/recording process, and a replay process, on the basis of an input operation that is detected by such as a button switch 45. A program for controlling the digital camera 10 is stored in a ROM unit 44.

When a release button 19 is depressed halfway, light metering, an AF (Auto-Focus) process, and an auto-exposure operation are carried out. In the AF process, a focusing lens in the photographing optical system 20 is driven in accordance to a phase difference that is detected by the AF sensor 32. An exposure controller 50 carries out the auto exposure operation, i.e., an exposure period (shutter speed) and an aperture value of the iris 22 are automatically set on the basis of the brightness of a target object that is detected by the AE sensor 34. The AE sensor 34 is herein a solid state image sensor such as a CCD and is driven by an AE sensor driver 29.

When the release button 19 is depressed completely, a photographing process is carried out. Concretely, the quick return mirror 24 and the half mirror 26 move to the outside of a light path and the iris 22 and the shutter 19 are driven in accordance to the calculated exposure values. Thus, one frame's object image is formed on the photo-receiving area of the image sensor 30.

The image sensor 30 is, for example, a charge-transfer type image sensor such as a CCD image sensor, or may be an X-Y address type image sensor such as a CMOS image sensor. Also, a color filter array 35 is disposed on the light-receiving area of the image sensor 30. One frame's worth of image-pixel signals that are generated by the image sensor 30 are read out by the image sensor driver 28 and are fed to the signal processor 40.

The signal processor 40 applies processing such as white-balance processing to one-frame's worth of image-pixel signals to generate color still-image data. The generated still-image data are temporarily stored in an inner memory 42 such as a RAM, and are recorded in an outer memory 46 such as a memory card either directly or compressed.

The exposure controller 50 outputs control signals to the image sensor driver 28 and the AE sensor driver 29 to adjust an output timing of drive signals that are output to the image sensor 30 and the AE sensor 34. The AE sensor driver 29 can output drive signals that allow neighboring pixels to be mixed or when reading the neighboring pixel signals.

Also, the exposure controller 50 can adjust an exposure value (hereinafter, called a "metering exposure value") by controlling an exposure such that an amount of exposure of the AE sensor 34 becomes an amount that is appropriate with respect to the brightness of the object. Concretely, an exposure time that is set based on an electronic shutter function is adjusted. Furthermore, the exposure controller 50 can adjust a gain value of the image-pixel signals read from the AE sensor 34.

On the other hand, when a face detection mode that automatically detects a face of an object is selected, the exposure controller 50 detects a face of an object by using the AE sensor 34 when light-metering is carried out, in accordance to a well-known detection method. A user may set the face detection mode in a state when a menu screen is displayed on the LCD 48.

In the present embodiment, a number of pixel signals that is mixed or added when reading the one frame's worth of image-pixel signals is adjusted so as to enlarge a dynamic range, and the number is different in response to an area defined in the light-receiving area of the AE sensor 34. Hereinafter, a pixel-signal mixture process in the AE sensor 34 is explained with reference to FIGS. 2-6. Note that the term "a pixel mixture" and the term "pixel signal mixture" used in the explanation below have the same meaning, and the term "pixel addition" is used similarly to the term "pixel mixture" or "image-pixel signal mixture.

Figure 2:
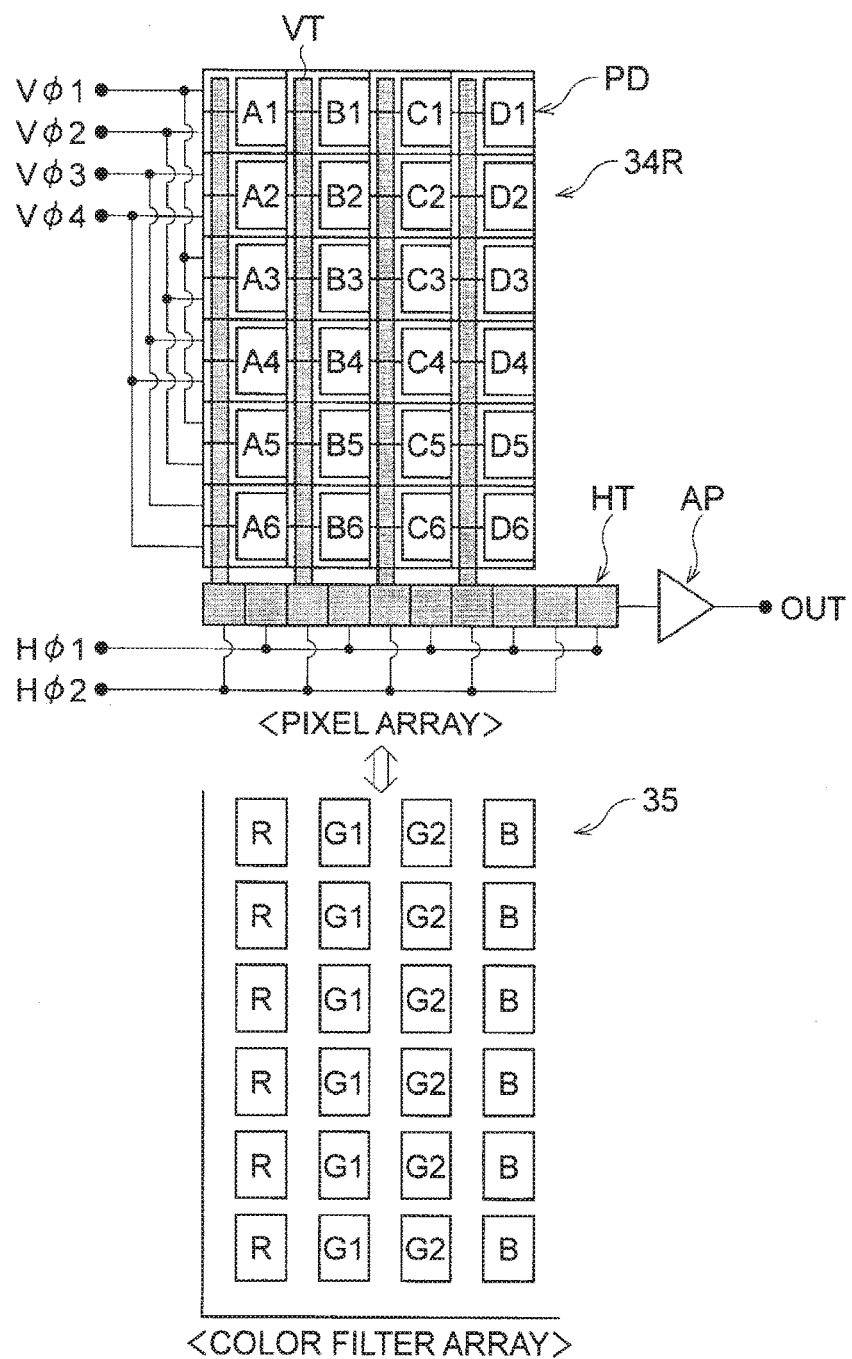
FIG. 2 is a view showing part of a pixel-array and a part of an electric circuit for the AE sensor.

FIG. 2 is a view showing part of a pixel-array and a part of an electric circuit for the AE sensor 34.

As described above, the AE sensor 34 is herein a CCD image sensor in which a plurality of pixels PD are matrix-arrayed along the vertical direction and the horizontal direction. In FIG. 2, twenty-four (6×4) pixels PD are shown, and the pixels PD are represented by reference numerals "A1-A6", "B1-B6", "C1-C6", and "D1-D6", respectively (hereinafter, the same reference numeral are used for image-pixel signals generated in a corresponding pixel).

The color filter array 35 has color filter elements R, G1, G2, and B, which have different spectrums respectively, and which are arranged so as to be opposite to pixels A1-A6, B1-B6, C1-C6, and D1-D6. The color filter elements R are arrayed in the same column, and the other color filter elements G1, G2, or B are also arrayed in the same columns, respectively. Electric charges that are generated in each photodiode by photoelectric conversion are transferred to a horizontal transform circuit HT by a vertical transform circuit VT, and are output from the horizontal transform circuit HT toward the signal processor 40 via an amplifier AP.

Figure 3:
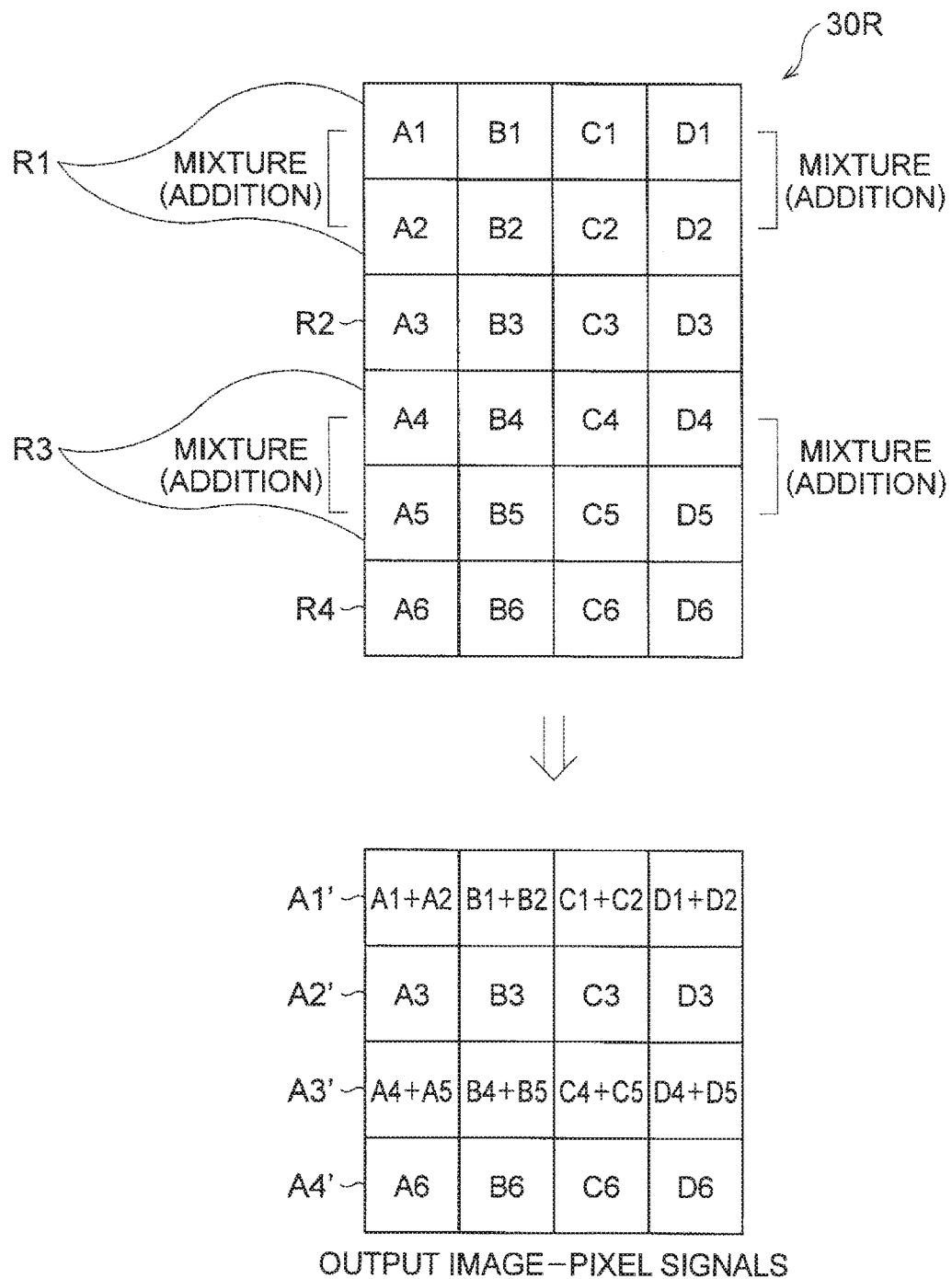
FIG. 3 is a view showing a mixture of image-pixel signals.

FIG. 3 is a view showing a mixture of image-pixel signals. Herein, a mixture method of image-pixel signals in a pixel area composed of twenty-four pixels is shown. The other image-pixel signals in other pixel areas are subjected to the same pixel mixture process.

The mixture process for image-pixel signals is applied to the color filter elements having the same color along the vertical/column direction. At this time, the number of image-pixel signals to be mixed, i.e., the number of pixel addition, is not uniform but different in each pixel area. Concretely, a mixed pixel area in which two image-pixel signals are mixed and a non-mixed pixel area in which each image-pixel signal is output directly (not mixed) are defined respectively such that the mixed pixel area and the non-mixed pixel area are lined up alternately. In the mixed pixel areas R1 and R3 shown in FIG. 3, image-pixel signals (A1, A2), (B1, B2), (C1, C2), and (D1, D2) that are neighboring one another along the vertical direction are mixed and read out, respectively. On the other hand, image-pixel signals (A3, B3, C3, and D3) and pixels (A6, B6, C6, and D6) in a non-mixed pixel area R2 and R4 are transferred vertically without a mixture with neighboring pixels. Consequently, image-pixel signals are readout from the AE sensor 34 as "four row's worth of image-pixel signals". For example, four image-pixel signals "A1', A2', A3', and A4'" are output from the first column. The similar pixel addition process is performed for the second to fourth rows and the other rows.

The read image-pixel signals are separated in accordance to the belonging pixel area, i.e., the number of pixels added to generate a frame's worth of image data for each of the different number of pixel additions. Consequently, two single frame's worth of pixel datum that have different sensitivity are generated from one frame's worth of image-pixel signals. Note that the pixel datum may be generated without a separation process of the image-pixel signals.

Hereinafter, a reading of image-pixel signals without the pixel addition process is designated as a "reading of image-pixel signals by the number of pixel addition "1"". The term "one pixel addition" or "the number of pixel addition "1"" means a reading of image-pixel signals without the pixel addition process.

Figure 4:
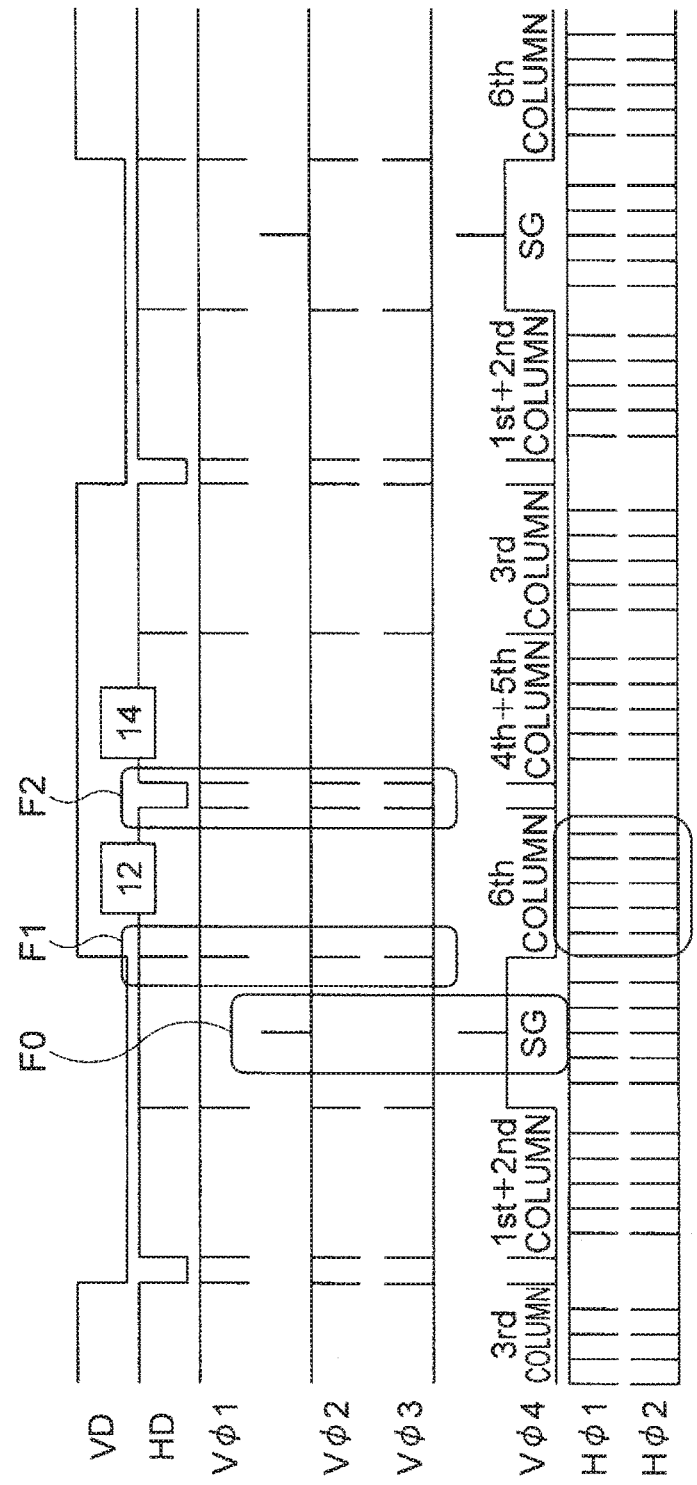
FIG. 4 is a timing chart of drive signals for reading image-pixel signals.

FIG. 4 is a timing chart of drive signals for reading image-pixel signals.

An image-pixel signal generated in each pixel is transferred to the vertical transform circuit VT by a drive signal F0. Then, image-pixel signals in the sixth row are read out directly by a drive signal F1, and image-pixel signals in the fourth and fifth rows are mixed and read out simultaneously. Similarly, image-pixel signals in the third row are read out directly, whereas image-pixel signals in the first and second rows are mixed and read out simultaneously. Such a control of driving signals corresponds to different number settings of the pixel addition pixel in accordance to the pixel areas. The exposure controller 50 determines the appropriate pixel addition.

Figure 5:
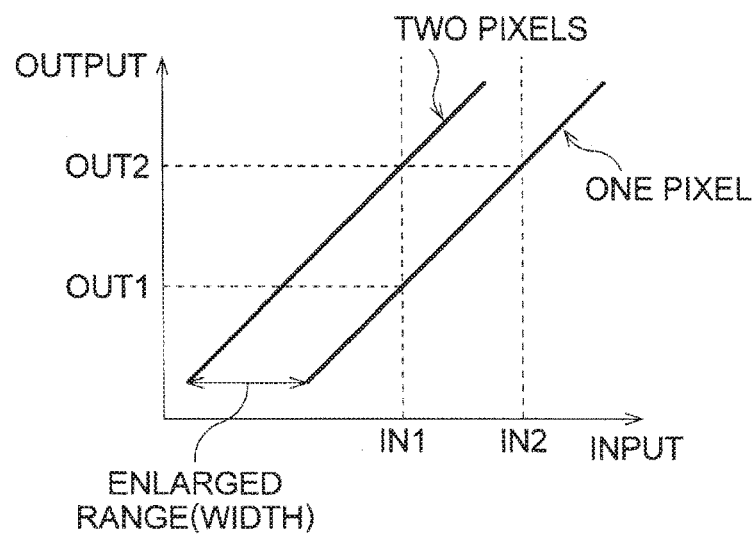
FIG. 5 is a view showing sensitivity characteristics of the AE sensor.
Figure 6:
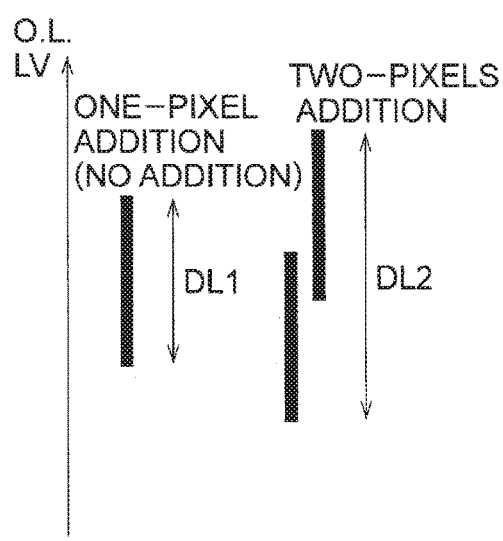
FIG. 6 is a view showing a dynamic range of the AE sensor that is enlarged by a pixel addition process based on different numbers of pixel addition

FIG. 5 is a view showing sensitivity characteristics of the AE sensor 34. FIG. 6 is a view showing a dynamic range of the AE sensor 34 that is enlarged by a pixel addition process based on different numbers of pixel addition.

In FIG. 5, a relationship between an input and an output of the AE sensor 34 is shown, and a relationship between an amount of incident light and output voltage regarding the one-pixel addition (no addition) and the two-pixel addition are represented by lines P1 and P2, respectively. Note that a graph shown in FIG. 5 is designated with a logarithmic scale.

As can be seen from a compression the line P1 with the line P2, an amount of light obtained by the two-pixel addition is twice as great as that obtained by the one-pixel addition. Therefore, when light having an amount of light "IN1" enters the AE sensor 34, an output value "OUT1" and an output value "OUT2" that is twice the output value of "OUT1" are acquired by the AE sensor 34.

Also, when the ratio of the input value "IN1" to the input value "IN2" that produces the same output value "OUT2" is two, a dynamic range based on the two-pixel addition differs from a dynamic range based on the one-pixel addition by a magnitude of two. The difference between the input value "IN1" and the input value "IN2" corresponds to an enlarged portion of the dynamic range of the AE sensor 34 (see FIG. 6).

In FIG. 6, the dynamic range "DL1" based on the one-pixel addition (no addition) and the dynamic range "DL2" based on the two-pixel addition are shown. The sensitivity obtained when performing the pixel addition process by the different numbers of pixel addition (e.g., 1 and 2) is enlarged compared with the sensitivity without performing the pixel addition process. By obtaining both the sensitivity with the number of pixel addition "2" and the sensitivity with the number of pixel addition "1", a dynamic range that covers both a low luminance portion, such as a dark portion, and a high luminance portion can be acquired. This enlarged dynamic range is caused by a sensitivity difference between neighboring pixels. Therefore, by alternately setting neighboring pixel areas that have different numbers of pixel addition in the AE sensor 34, two pixel datum that have different sensitivities and have the same image area corresponding to one frame's worth are generated from a single object. Consequently, a total object captured by the photographing optical system 20 is imaged or picked up by an enlarged dynamic range.

Since the two pixel data corresponding to one frame's worth are obtained with the same shutter timing, the brightness of an object can be detected adequately even though the object is a moving subject. This effect is not obtainable from a method that photographs an object while changing an exposure in time series. Furthermore, pixel areas that have different numbers of pixel addition are defined uniformly with respect to the total light-receiving area; a degree of enlargement of a dynamic range becomes uniform with respect to an object image formed on the entire light-receiving area.

Also, since the pixel areas that have different numbers of pixel addition are defined with respect to only a column/vertical direction to which electric charges are transferred, image-pixel signals having two sensitivities are read out so that the brightness of an object image can be easily detected after the reading of image-pixel signals. Especially, since the vertical direction is a direction in which the same color filter elements R, G1, G2 or B are arrayed, an enlargement of a dynamic range reaches each color of image-pixel signals.

In this way, the digital camera 10 according to the present embodiment is equipped with the AE sensor 34 with a color filter array 35 in which R, G, and B color filter elements are arrayed along the vertical direction separately. Then, in the pixel-signal reading process, the image sensor driver 28 performs a reading process that mixes neighboring pixel signals (the number of pixel addition "2") and a reading process that does not mix pixel signals (the number of pixel addition "1") alternately.

Next, a digital camera according to the second embodiment is explained with reference to FIGS. 7 and 8. In the second embodiment, an AE sensor is constructed of a CMOS image sensor. Other constructions are substantially the same as those in the first embodiment.

Figure 7:
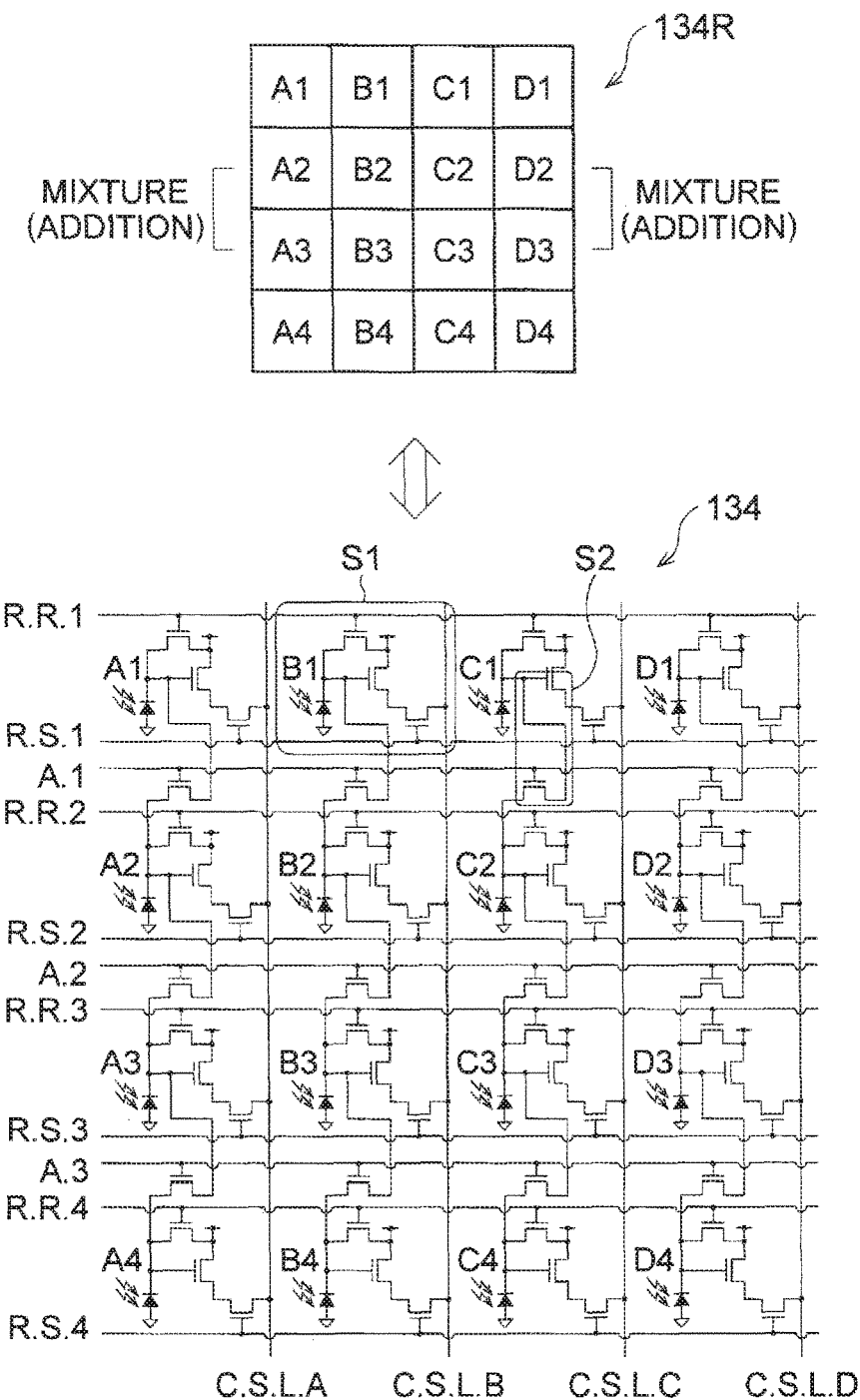
FIG. 7 is a view showing part of a pixel-array and a part of an electric circuit for the AE sensor, according to the second embodiment.

FIG. 7 is a view showing part of a pixel-array and a part of an electric circuit for the AE sensor, according to the second embodiment. FIG. 8 is a view showing a timing chart of drive signals according to the second embodiment.

An AE sensor 134 is a CMOS image sensor that is an X-Y address type image sensor. In FIG. 7, the part of pixel array 134R composed of (4×4) pixels (A1-A4, B1-B4, C1-C4, and D1-D4) are shown. Similarly to the first embodiment, a color filter array is disposed on the AE sensor 134 and the same color filter elements are arrayed in the column direction.

Each pixel has an image-pixel signal generating and outputting circuit S1. Also, a series of switch circuits S2 are provided along the column direction and the switch circuits S2 connect an output of image-pixel signals generated by a pixel with an output of image-pixel signals generated by neighboring pixels. When the switch circuits S2 are turned on, image-pixel signals are mixed between neighboring pixels along the column direction.

When reading image-pixel signals based on the number of pixel addition "1" (no addition), image-pixel signals are read out along a line (row) directly so that image-pixel signals are read out line by line. On the other hand, when reading image-pixel signals based on the number of pixel addition "2", two lines' worth of image-pixel signals are mixed and read out.

In the second embodiment, a reading of image-pixel signals based on the number of pixel addition "2" is performed once and then a reading of image-pixel signals based on the number of pixel addition "2" is performed two times continuously after that. Such a reading process is performed along the column direction repeatedly. This reading method is different from an alternate reading of image-pixel signals based on the number of pixel addition "2" and image-pixel signals based on the number of pixel addition "1" described in the first embodiment.

Figure 8:
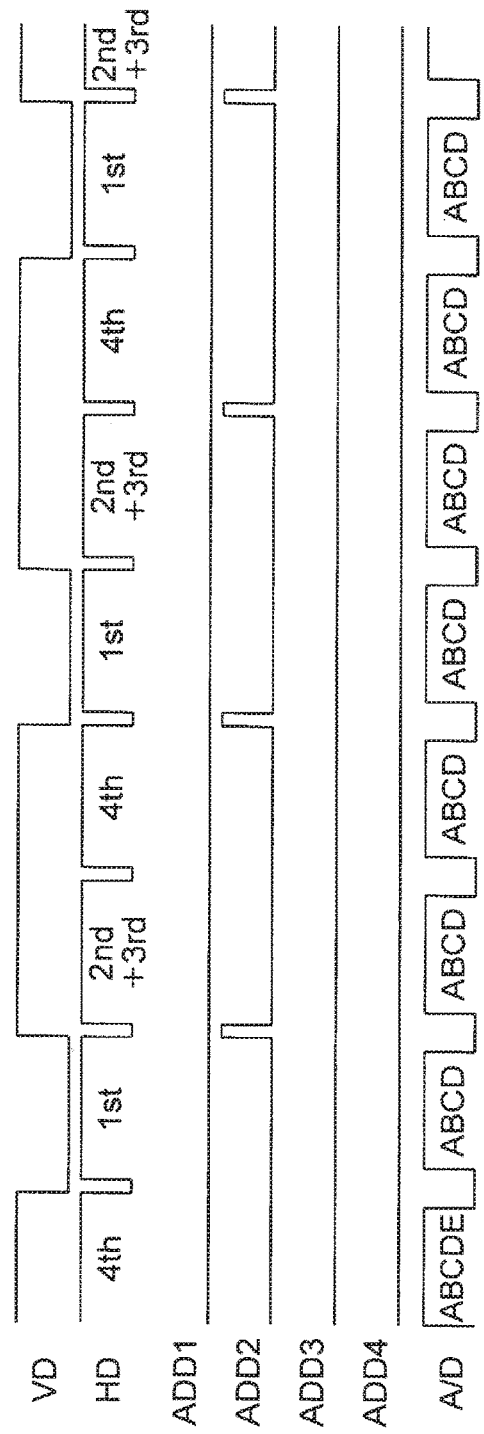
FIG. 8 is a view showing a timing chart of drive signals according to the second embodiment.

Concretely speaking, as shown in FIG. 8, image-pixel signals in the 1st row are read out and image-pixel signals in the 2nd and 3rd rows are read out while mixing. Image-pixel signals in the $4^{th}$ row are read out directly. Such a reading causes a sensitivity difference in the column direction so that a dynamic range is enlarged.

Next, the third embodiment is explained with reference to FIGS. 9 and 10. The third embodiment is different from the first embodiment in that pixel areas that have different numbers of pixel addition are defined along the row direction or the row and column directions. An image sensor is applied to a CMOS image sensor similarly to the second embodiment. Note a CCD image sensor may be also applied.

Figure 9:
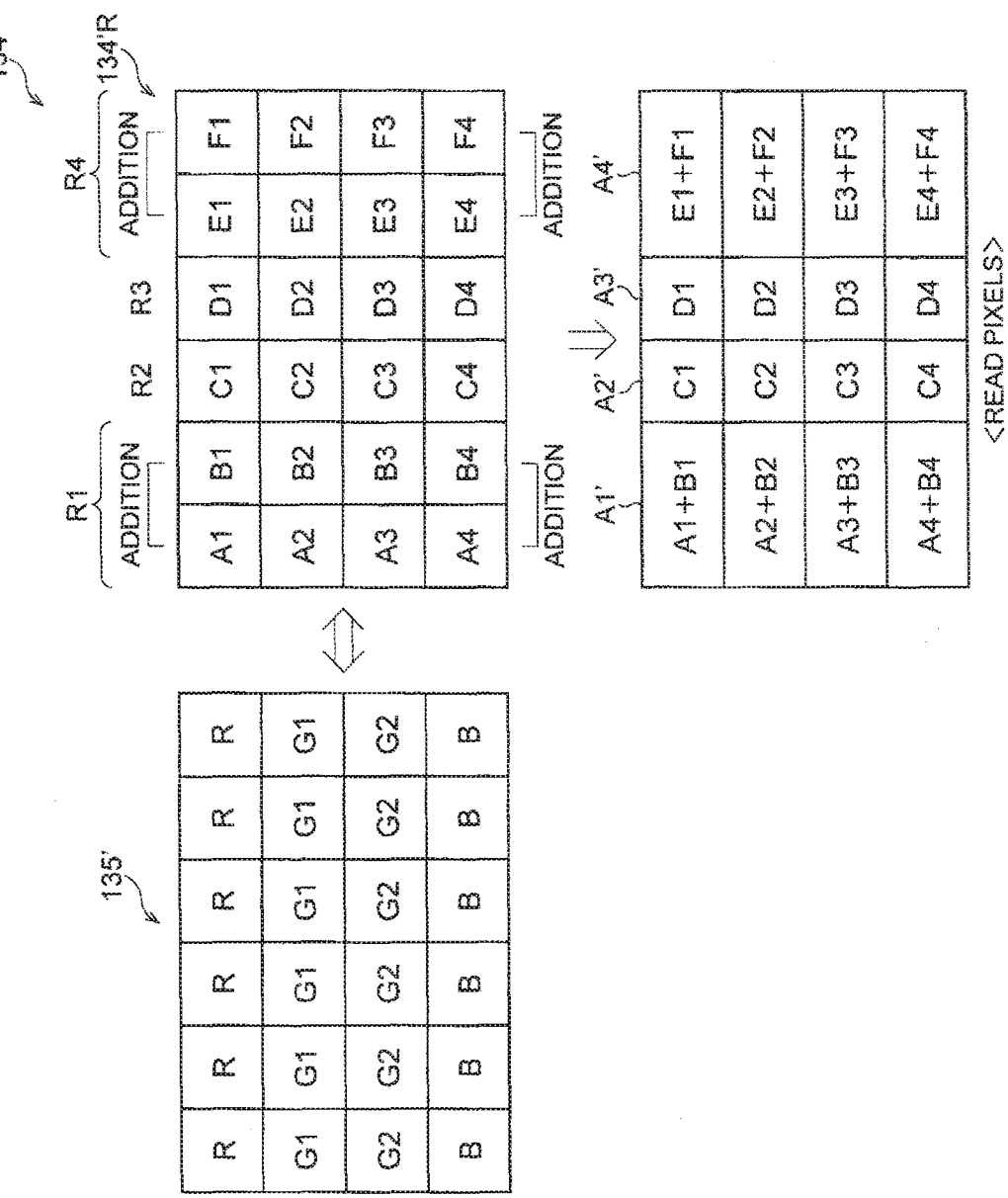
FIG. 9 is a view illustrating a pixel addition process according to the third embodiment.

FIG. 9 is a view illustrating a pixel addition process according to the third embodiment.

In FIG. 9, part of a 6×4 pixel array 134'R in the AE sensor is illustrated. A color filter array 135' is disposed on the AE sensor 134' and the color filter elements 135' R, G1, G2, and B are arrayed in the horizontal direction, i.e., the row direction in each color. Then, a pixel addition process using different numbers of pixel addition is performed with respect to the row direction.

Concretely speaking, the number of pixel addition "2" is applied to neighboring pixel areas R2 and R4 along the column direction, and the number of pixel addition "1" is applied to pixel areas R2 and R3 located between the pixel areas R1 and R4. Consequently, four image-pixel signals "A1'-A4'" along the row direction are read out. The AE sensor 134 has switch circuits that are the same as those shown in FIG. 7 according to the second embodiment. The switch circuits allows neighboring image-pixel signals along the column to be mixed, and a pixel addition process based on the number of pixel addition "1" and the number of pixel addition "2" is performed. Note that, when the AE sensor 134 is a CCD image sensor, a pixel addition process along the column is performed by utilizing a horizontal transfer circuit.

FIGS. 10A and 10B illustrate a pixel addition process along the row and column directions, respectively.

Herein, a pixel addition process based on different numbers of pixel addition is applied to both the row and column direction. As for the row direction, a reading of image-pixel signals based on the number of pixel addition "1" and a reading of image-pixel signals based on the number of pixel addition "2" are performed alternately similarly to the first embodiment. Furthermore, a similar alternate reading process is performed for the column direction. Consequently, image-pixel signals based on three different numbers of pixel addition "1", "2", and "4" are read out for the whole pixel area.

On the other hand, different numbers of pixel addition may be set for the row direction and the column direction separately. As shown in FIG. 10B, a reading of image pixel signals based on the number of pixel addition "1" and the number of pixel addition "2" is performed for the row direction, whereas a reading of image-pixel signals based on the number of pixel addition "1" and the number of pixel addition "3" is performed for the column direction. Consequently, image-pixel signals based on four different numbers of pixel addition "1", "2", "4", and "6" are read out for the whole pixel area.

When pixel areas having different numbers of pixel addition are defined alternately such that the ratio of different numbers of pixel addition along the row direction is "1:k" and the ratio of different numbers of pixel addition along the column direction is "1:1 " (1 and k are integers greater than or equal to 2), image-pixel signals based on the ratio of numbers of pixel addition "1:k:k×l" are read out. Note that in a pixel addition process as shown in FIGS. 10A and 10B, an image sensor without a color filter array may be applied.

The exposure controller 50 controls the image sensor driver 28 to allow a given number of pixel addition along the row to be set. A setting of the number of pixel addition may be switched by a photography program stored in the ROM memory in advance. For example, the number of pixel addition set in accordance to an operation input by a user.

Furthermore, instead of setting a pixel area in which image-pixel signals are mixed and a pixel area in which image-pixel signals are not mixed, pixel areas in which image-pixel signals are mixed, i.e., the number of pixel addition is equal to or more than 2, may be defined for all of the light-receiving area (e.g., the number of pixel addition "2" and the number of pixel addition "4"). This pixel addition process causes an enlargement of the dynamic range. Generally speaking, a pixel addition process based on the number of pixel addition "m" and the number of pixel addition "n" along the row and/or column direction may be performed, regarding the first to third embodiments. Note that "m" and "n" are integers that satisfy "m≥1" and "m<n".

In the first to third embodiments, the pixel addition process is performed for the whole light-receiving area. However, the pixel addition process may be performed for a part of the light-receiving area.

In the first embodiment, image-pixel signals are mixed when transferring the image-pixel signals to the horizontal transfer circuit in the AE sensor that is constructed from a CCD. However, the mixture of image-pixel signals may be carried out on the vertical transfer circuit, the horizontal transfer circuit, or an output circuit.

In the case of the second and third embodiments that use an X-Y address type image sensor, pixel areas having different numbers of pixel addition may be defined along a diagonal direction instead of the row or column direction. In this case, a color filter array in which color filter elements are checkered is used. Note that a setting of the number of pixel addition along the diagonal direction is the same as a setting of the number of pixel addition along the row and column directions, and may be applied to an image sensor without a color filter array.

Next, the fourth embodiment is explained with reference to FIGS. 11-14. In the fourth embodiment, a setting of a pixel addition process is switched in accordance to a photographic situation, an exposure of an object, etc. The other constructions are substantially the same as those in the first to third embodiments.

A circuit diagram of the digital camera according to the fourth embodiment is substantially the same as that according to the first embodiment shown in FIG. 1, and light metering is carried out by the AE sensor 34. An object image captured by the photographing optical system 20 is formed on the image sensor 30 by an operation of the release button 19, and still image data is recorded. An exposure value for the image sensor 30 when recording the still image is determined on the basis of the brightness of the object image detected by the AE sensor 34.

Figure 11:
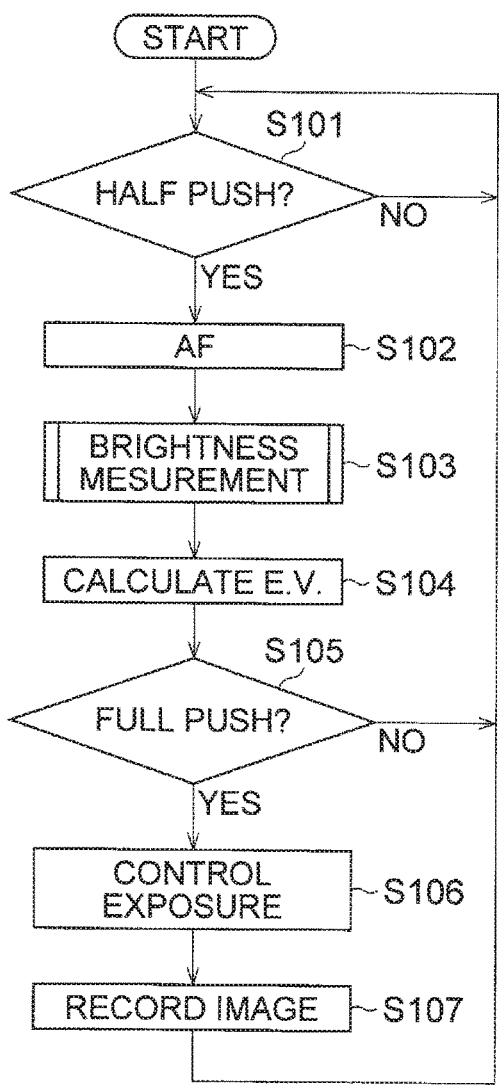
FIG. 11 is a flowchart of a sequence of a recording process.
Figure 12:
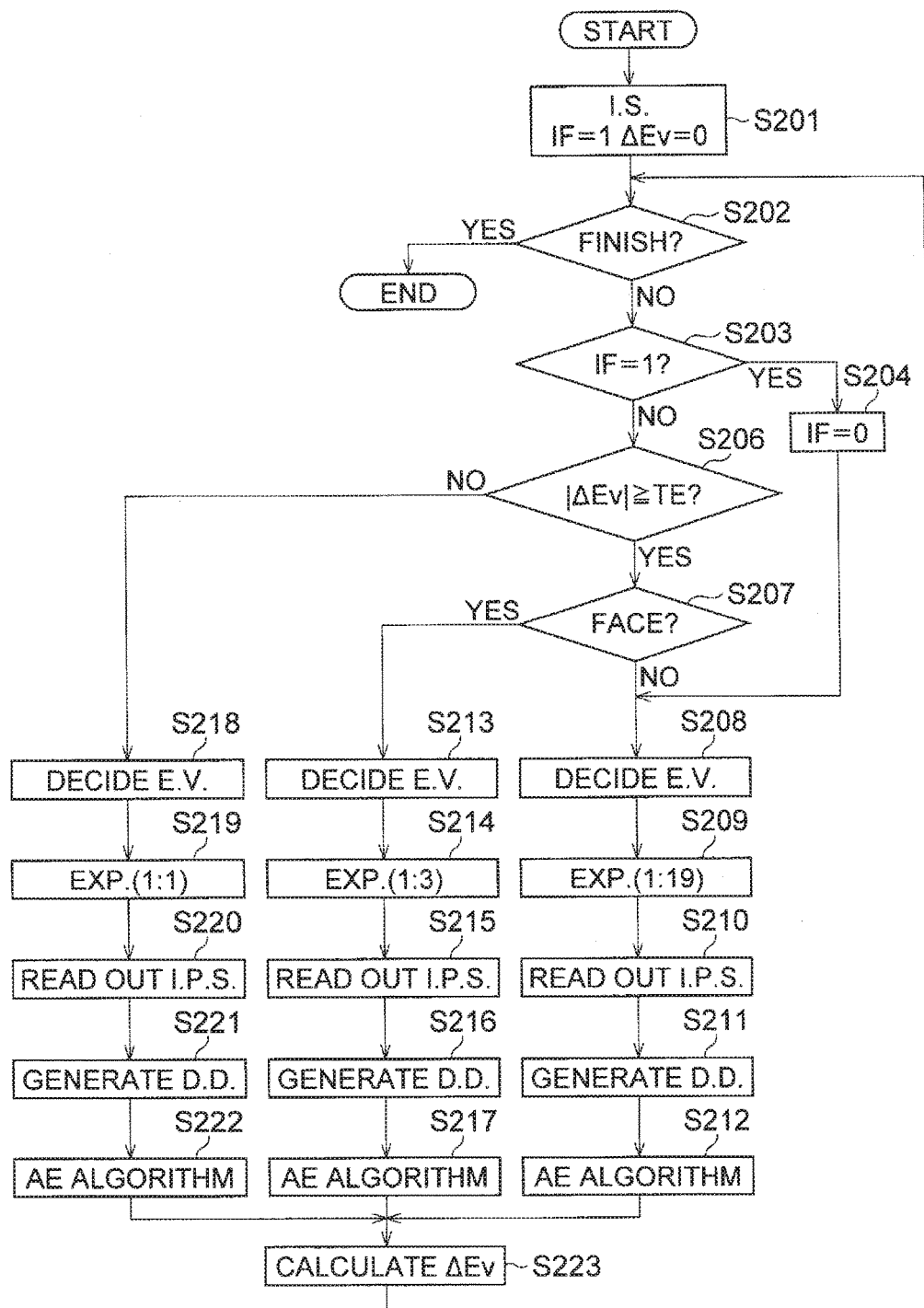
FIG. 12 is a subroutine of Step S103 in FIG. 11.

FIG. 11 is a flowchart of a sequence of a recording process. FIG. 12 is a subroutine of Step S103 in FIG. 11.

When release button 19 is depressed halfway, the AF process is carried out and the brightness of an object image is detected (S101-S103). Then, exposure values such as a shutter speed, an aperture value of the iris (F number) are decided (S104). Note that when electric power is turned on, the brightness of an object image is detected similarly to the process of Step S103.

When performing the brightness detection of the object image, i.e., a metering process, a pixel addition process is carried out as required to enlarge a dynamic range of the AE sensor 34. Then, as described below, an exposure adjustment process for the AE sensor 34 is carried out to correct or modify an exposure value (a metering exposure value). The brightness of an object image is then detected on the basis of the corrected exposure value. At this time, the pixel addition process is not carried out.

When the release button 19 is depressed completely, the sequence of a recording process including an exposure control such as the opening/closing of the shutter and the generation of still image data is carried out (S105-S107). At this time, the recording process is carried out on the basis of the set exposure value for the image sensor 30.

Hereinafter, a metering process is explained in detail with reference to FIG. 12. In the present embodiment, a "1:1" pixel addition process in which the number of pixel addition "1" is set for an entire pixel area (no pixel addition), a "1:3" pixel addition process in which the number of pixel addition "1" and the number of pixel addition "3" are set for a pixel area alternately, or a "1:19" pixel addition process in which the number of pixel addition "1" and the number of pixel addition "19" are set for a pixel area alternately is selectively carried out in accordance to a photographic situation.

When the metering process is started, an initial flag IF and an exposure difference ΔEv that represents a previous exposure amount and a present exposure amount are subject to an initial setting; concretely, IF is set to 1 and ΔEv is set to zero (S201). Then, it is determined whether or not the flag is 1 unless the metering process is not terminated.

The initial flag IF is a flag that determines whether or not a present metering process in the sequence of a photographing/recording process is a first metering process. When it is determined that the initial flag IF=1, the initial flag IF is changed to 0, and the process goes to Step S208 to enlarge a dynamic range of the AE sensor 34.

In Step S208, a predetermined initial value is set with respect to an exposure value of the AE sensor 34. Then, In Step S209 and S210, the above "1:19" pixel addition process is performed. Herein, an exposure period for the electronic shutter function is adjusted for an exposure. Image-pixel signals read from the entire light-receiving area are converted to detection data corresponding to an exposure operation and a representative value (such as an average value) is calculated from the detection data (S211, S212). Then, an exposure difference Δ Ev is calculated (S223). Note that ΔEv obtained by the first metering process represents a difference between the representative value and a reference or target value.

In the case of a photographic situation in which a luminance level of a target object does not change sharply, the process proceeds to Steps S203, S206, and S218 in the 2nd metering process to carry out the "1:1" pixel addition process. Then, an exposure value is corrected on the basis of the calculated exposure difference ΔEv (S218), and the "1:1"

pixel addition process is carried out (S219, S220). Consequently, a representative value that represents an accurate brightness of the object image is detected through the performance of Steps S221 and S222.

Figure 13:
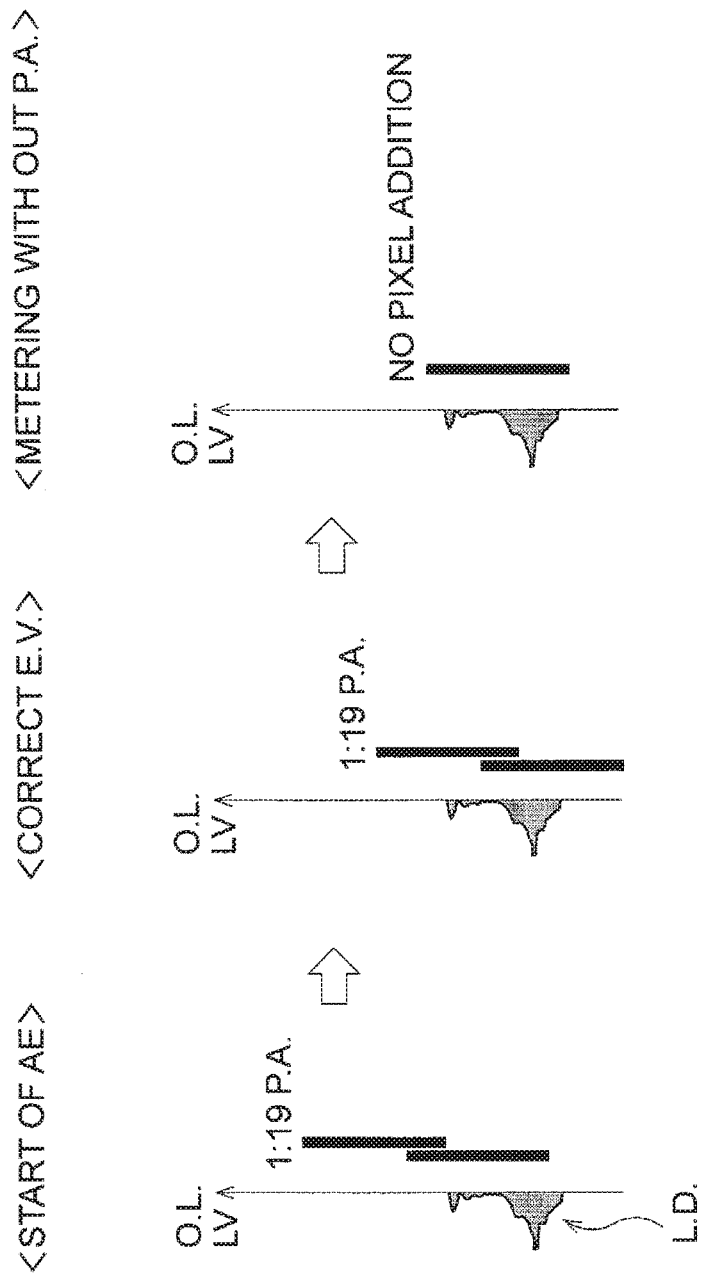
FIG. 13 is a view showing a pixel addition process when starting the metering process.

FIG. 13 is a view showing a pixel addition process when starting the metering process.

When performing the first metering process using the AE sensor 34, an actual brightness level of an object has not been determined before the brightness detection process. Therefore, the "1:19" pixel addition process is carried out as described above to obtain two pixel data with different sensitivities that correspond to one frame's worth, respectively. Thus, a dynamic range covering the difference between a low luminance level and high luminance level is acquired and the exposure difference ΔEv at the first metering process is calculated as described above.

Then, the initially set metering exposure values of the AE sensor 34, such as an exposure time, a gain value, etc., are corrected in response to the calculated the exposure difference ΔEv. Then, in the next metering process, the "1:1" pixel addition process is carried out. Thus, image-pixel signals are generated in the AE sensor 34 on the basis of exposure values accurate for the actual brightness of an object image and read out from the AE sensor 34 so that a luminance value is precisely detected.

On the other hand, when a luminance level of the object image changes rapidly during metering, detection data occasionally becomes saturated, resulting in inaccurate detection of the brightness of the object image. When this occurs, it is determined that the luminance level of the object image suddenly changes when the luminance level exceeds a given range, and the "1:19" pixel addition process is carried out to enlarge the dynamic range of the AE sensor 34.

Concretely speaking, when the absolute value of an exposure difference Δ Ev is greater than or equal to a predetermined threshold value TE (S206), the process proceeds to Step S208-S212 in a condition that the face detection mode is not set. By performing the "1:19" pixel addition process, an exposure difference Δ Ev is obtained similarly to the first metering process described above. Then, when the exposure difference ΔEv becomes smaller than the threshold value TE by correcting the exposure value of the AE sensor 34, the process advances to Step S218-222 to perform the "1:1" pixel addition process. Thus, the brightness of an object image can be detected precisely.

Figure 14:
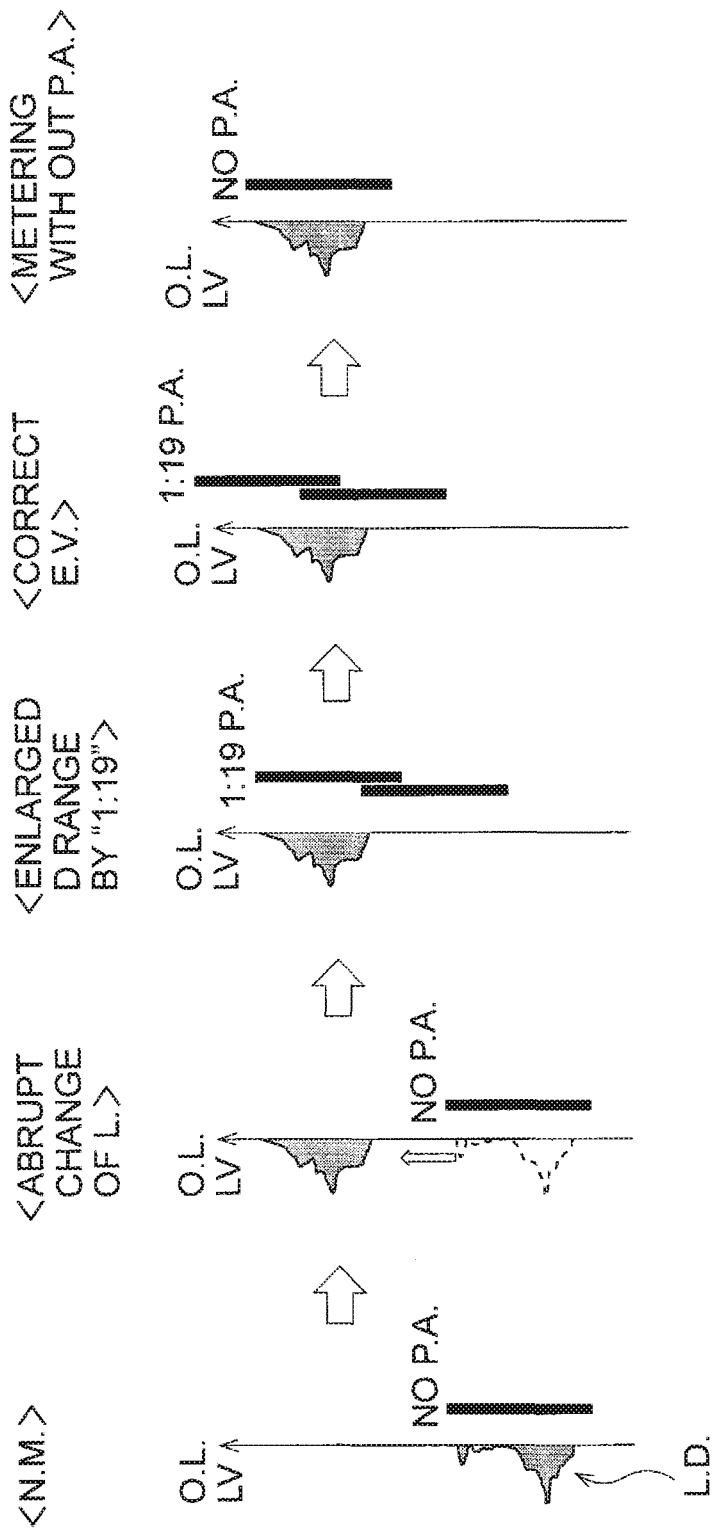
FIG. 14 is a view showing a pixel addition process when the brightness of the object image rapidly changes.

FIG. 14 is a view showing a pixel addition process when the brightness of the object image rapidly changes.

When the luminance level of an subject changes abruptly in a situation where the "1:1" pixel addition process is performed, the "1:19" pixel addition process is carried out to enlarge the dynamic range. Then, the exposure value of the AE sensor 34 is corrected and the luminance level of the object image is measured using the "1:1" pixel addition process.

On the other hand, when the face detection mode is set, the light-receiving area of the AE sensor 34 is divided into a plurality of areas. If the number of pixel addition is relatively large, occasionally a situation occurs in which a face of an object cannot be detected due to a reduction in the resolution of an object image. Therefore, when the brightness of the object image rapidly changes in a situation in which the face detection mode is set, the "1:3" pixel addition process in which the number of pixel addition is relatively small is carried out.

Concretely, when it is determined at Step S207 that the face detection mode is set, the "1:3" pixel addition process is carried out (S213-S217). Such a small number of pixel addition allows the AE sensor 34 to enlarge the dynamic range and detect the face of an object.

In this way, in the fourth embodiment, the "1:19" pixel addition process is carried out when the metering process is started and an object luminance is calculated. Then, the exposure difference ΔEv is calculated and the exposure time of the AE sensor 34 is adjusted based on the exposure difference ΔEv. The "1:1" pixel addition process (not pixel addition) is carried out after the adjustment of the exposure time. An exposure value to the image sensor 30 is operated on the basis of an object luminance that is obtained by the "1:1" pixel addition process.

Also, when an object luminance changes abruptly, the "1:19" pixel addition process is carried out and the exposure values including the exposure time and the gain value is adjusted. Then, the "1:1" pixel addition process is carried out after the adjustment of the exposure values. Furthermore, when the face detection mode is set, the "1:3" pixel addition process in which the number of pixel addition is relatively small is carried out.

Since the number of pixel addition is switched or changed in response to a photograph situation, a change of an object luminance, a metering mode, and so on, the brightness of an object can be measured simultaneously. Especially, since the number of pixel addition is switched with respect to the number of pixel addition that is equal to or more than 2, an enlarged width of the dynamic range can be set minutely. Also, when electric power is turned on, the "1:19" pixel addition process is carried out at the same time. Thus, a user can photograph quickly after turning electric power on.

The "1:19" pixel addition process is herein carried out only once, however, this process may be carried out repeatedly (e.g., twice or three times) so as to perform a feedback control. Especially, an exposure may be adjusted such that ΔEv becomes equal to or less than a tolerance value. The pixel addition process may be carried out along the column direction or the column and row directions by different numbers of pixel addition, similarly to the third embodiment.

As for the number of pixel addition, numerical value other than "3" and "19" may be set. Also, as for the switching process of the number of pixel addition, a pixel addition process that performs for the whole of the light-receiving area by the same number including "1" may be included in the switching between some pixel addition processes. For example, the number of pixel addition "3", "5", or "9" may be selectively set for the whole of the light-receiving area in accordance to a photograph situation, and the number of pixel addition can be selected from the above numbers of pixel addition "3", "5", "9" and the different numbers of pixel addition (e.g., 1:3, 1:9). The pixel addition process that is performed along the row or column uniformly by using the same number of pixel addition causes effect of an enlargement of the dynamic range with respect to a specific object. Therefore, by switching between the pixel addition process based on the number of pixel addition (≥2) that is uniform for the whole of the light-receiving area and the pixel addition process based on the number of pixel addition that is different in the pixel area, various enlargements of the dynamic range can be realized.

Next, the fifth embodiment is explained with reference to FIGS. 15 to 17. In the fifth embodiment, in a dark current reduction process based on OB (optical black) pixels, a pixel value correction based on the number of pixel addition is carried out. Other constructions are substantially the same as those in the first embodiment.

Figure 15:
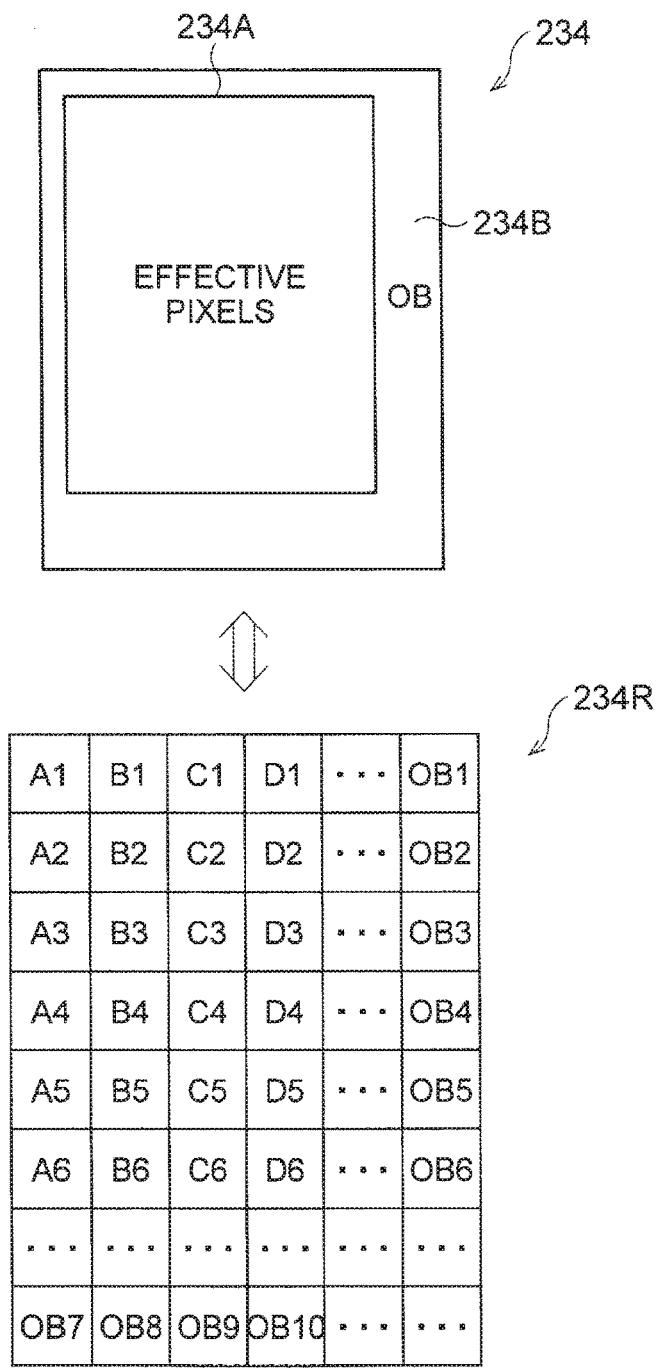
FIG. 15 is a view showing a pixel array of the AE sensor according to the fifth embodiment.

FIG. 15 is a view showing a pixel array of the AE sensor according to the fifth embodiment.

An AE sensor 234 has an effective pixel area 234A and a shaded OB pixel area 234B. A luminance level of the object image is calculated on the basis of image-pixel signals (effective image-pixel signals) read from pixels in the effective pixel area 234A. On the other hand, dark current components included in the effective image-pixel signals are removed on the basis of OB image-pixel signals read from pixels in the OB pixel area 234B. FIG. 15 illustrates a portion of OB pixels OB1-OB6 that are arrayed at the right side of the effective pixel area 234A and a portion of OB pixels OB7-OB10 that are arrayed at the bottom side of the effective pixel area 234A.

FIG. 16 is a view showing a pixel addition process along the row direction by different numbers of pixel addition. FIG. 17 is a view showing a pixel addition process along the column direction by different numbers of pixel addition.

In the present embodiment, OB image-pixel signals are mixed in response to the number of pixel addition. Concretely, as for mixed image-pixel signals A1+A2, B1+B2, C1+C2, D1+D2, . . . , OB image-pixel signals OB1 and OB2 are mixed and read out. ON the other hand, as for image-pixel signals A3, B3, C3, D3, . . . , OB image-pixel signals are directly read out.

Then, pixel values are corrected, i.e., the mixed OB image-pixel signals OB1+OB2 are subtracted from the mixed image-pixel signals A1+A2, B1+B2, C1+C2, D1+D2, . . . , respectively. On the other hand, the OB image-pixel signal OB3 is subtracted from the image-pixel signals A3, B3, C3, D3, . . . , respectively. Image-pixel signals in other pixel areas are also subtracted or reduced by the corresponding OB image-pixel signals to remove dark current components.

FIG. 17 depicts a reading process of OB image-pixel signals when image-pixel signals a read along the column direction by different numbers of pixel addition. As for image-pixel signals A1+B1, A2+B2, . . . , that are mixed along the column direction, OB image-pixel signals OB7 and OB8 are mixed, and pixel values are corrected with the mixed OB image-pixel signals. As for image-pixel signals C1, C2, . . . , pixel values are corrected with the OB image-pixel signal OB9.

In this way, in the fifth embodiment, the reading of image-pixel signals based on the number of pixel addition "2" and the reading of image-pixel signals based on the number of pixel addition "1" are performed for the effective pixels alternately. Accordingly, the reading of image-pixel signals based on the number of pixel addition that corresponds to the corresponding effective pixels is performed for the OB pixels. Then, the OB image pixel signal components are subtracted from the effective pixel signal components to remove dark current components.

In the present embodiment, the reduction of a dark current component may be carried out by multiplying a given OB image-pixel signal by the number of pixel addition, instead of an mixture of neighboring image-pixel signals. For example, when the number of pixel addition is "2", a pixel value of an OB image-pixel signals is multiplied by 2 to remove a dark current.

Also, pixel values of image-pixel signals may be corrected on the basis of a representative value such as an average value of OB image-pixel signals. For example, an average value OBA of all of OB image-pixel signals along the row is calculated. Then, when image-pixel signals are based on the number of pixel addition is "2", the average value is multiplied by 2 to correct a pixel value of an image-pixel signal, whereas the average value is directly used when image-pixel signals are based on the number of pixel addition is "1".

In the first to fifth embodiments, the above pixel addition process is performed by using the AE sensor for the SLR type digital camera that is provided in the optical finder. However, an external AE sensor for a compact type camera that is not provided in an optical finder may be applied. Also, the above pixel addition process may be a camera that detects the brightness of an object by an image sensor for photographing.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Applications No. 2013-227496 (filed on Oct. 31, 2013), No. 2013-227463 (filed on Oct. 31, 2013), and No. 2013-227405 (filed on Oct. 31, 2013), which are expressly incorporated herein by reference, in their entireties.

The invention claimed is:

1. An apparatus for imaging an object, comprising:
   a metering image sensor that comprises a plurality of pixels, the plurality of pixels being matrix-arrayed along vertical and horizontal directions;
   a photography image sensor;
   an image sensor driver that drives the metering image sensor, the image sensor driver configured to read image-pixel signals of neighboring pixels among the plurality of pixels while mixing the image-pixel signals;
   a pixel addition setting processor that sets a number of pixel addition of the metering image sensor with respect to at least one of at least one row and at least one column, the pixel addition setting processor configured to set different numbers of pixel addition to different pixel areas; and
   an exposure controller that controls an exposure of the metering image sensor and the photography image sensor,
   wherein the pixel addition setting processor is configured to switch the number of pixel addition,
   wherein the image sensor driver is configured to read the image-pixel signals in response to the set number of pixel addition,
   wherein the exposure controller is configured to set an exposure value of the photography image sensor based on a brightness of an object image that is detected by the metering image sensor, and
   wherein the pixel addition setting is determined based on a detected luminance.

2. The apparatus of claim 1, wherein the pixel addition setting processor sets n number of pixel addition and m number of pixel addition with respect to at least one of the at least one row and the at least one column, respectively,
   the n number and the m number being integers,
   the m number is greater than or equal to 1, and
   the m number is greater than the n number.

3. The apparatus of claim 2, wherein the pixel addition setting processor switches the number of pixel addition between at least the n number of pixel addition and the m number of pixel addition.

4. The apparatus of claim 2, wherein the pixel addition setting processor sets the n number of pixel addition and the m number of pixel addition in response to start of metering by the metering image sensor, the exposure controller adjusting a metering exposure value of the metering image sensor based on the image-pixel signals read from the metering image sensor.

5. The apparatus of claim 2, wherein the pixel addition setting processor sets the n number of pixel addition and the m number of pixel addition when electric power is turned on, the exposure controller adjusting a metering exposure value of the metering image sensor based on the image-pixel signals read from the metering image sensor.

6. The apparatus of claim 2, the pixel addition setting processor sets the n number of pixel addition and the m number of pixel addition when a luminance level of an object is outside of a given range, the exposure controller adjusting a metering exposure value of the metering image sensor based on the image-pixel signals read from the metering image sensor.

7. The apparatus of claim 6, further comprising a face detector that detects a face of an object based on the image-pixel signals read from the metering image sensor, the pixel addition setting processor sets a number of pixel addition that is smaller than the n number of pixel addition when a face detection mode is set.

8. The apparatus of claim 4, wherein the image sensor driver reads image-pixel signals from the metering image sensor after an exposure adjustment of the metering image sensor by the exposure controller.

\* \* \* \* \*